June 14, 1938.  J. G. VALENZUELA  2,120,878
SLIDE RULE
Filed June 12, 1935
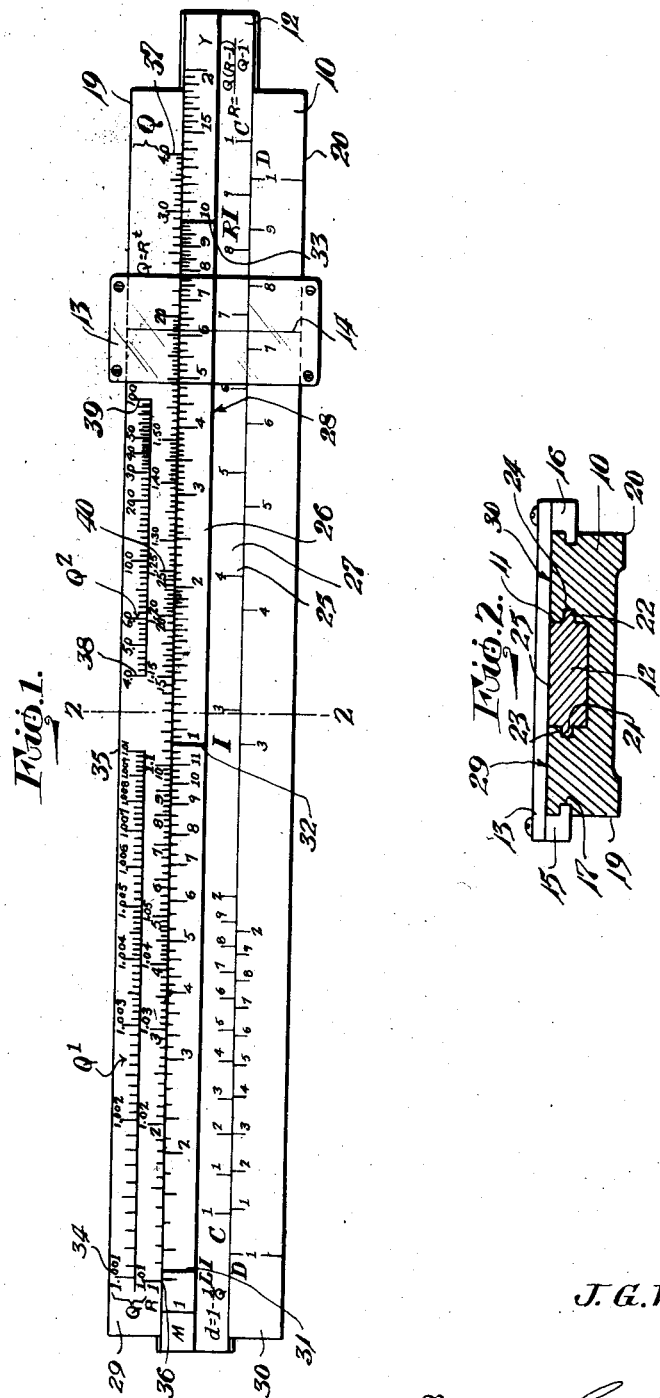
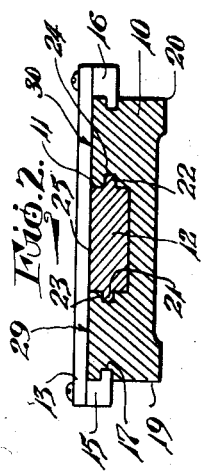
Inventor
J. G. Valenzuela
By Geo. P. Kimmel
Attorney Patented June 14, 1938

2,120,878

UNITED STATES PATENT OFFICE 2,120,878

SLIDE RULE

José G. Valenzuela, Ciudad Anahuac, Mexico

Application June 12, 1935, Serial No. 26,251
In Mexico July 5, 1934

2 Claims. (Cl. 235—70)

This invention relates to slide rules, and has for one object to provide, in a manner as hereinafter set forth, an article of such class having means for obtaining directly factors for compound interest computations.

Another object of this invention is to provide means for quickly mechanically computing mathematical factors usable for making computations of compound interest, annuities, discounts, etc.

A further object of this invention is to provide, in a manner as hereinafter set forth, an article of the class referred to having means to work out directly factors for the computation of annuities, discounts, and other operations relating to compound interest.

Another object is to provide means for quickly and easily making complicated mathematical computations and for presenting the result upon a direct reading indicia system.

A further object of the invention is to provide, in a manner as hereinafter set forth, an article of this class having a series of scales marked by log and log log spacing and so formed as to co-act with each other to obtain factors for compound computations which are capable of being used in connection with the ordinary slide rule for working out factors for the computation of annuities, discounts and other operations relating to compound interest.

Another object of this invention is to incorporate in an ordinary slide rule an indicia system reading directly in terms of compound interest factors from 1.001 to 100.000.

Further objects of the invention are to provide, in a manner as hereinafter set forth, a slide rule for the purpose referred to which is comparatively simple in its construction and arrangement, strong, durable, compact, thoroughly efficient in its use, readily assembled, conveniently operated and inexpensive to manufacture.

With the foregoing and other objects in view, the invention consists of such scales and combinations thereof as are hereinafter more specifically described and as are illustrated in the accompanying drawing wherein is shown a slide rule incorporating features of the invention, but it is to be understood that changes, variations and modifications may be resorted to which fall within the scope of the invention as claimed.

In the drawing: Figure 1 is a front elevation of the slide rule, in accordance with the invention; and Figure 2 is a cross sectional view thereof, on the line 2—2 in Figure 1.

The scales of this invention are applicable to any of the customary and usual structural arrangements of slide rules and for purposes of simplicity they have been shown as applied to one of the simplest forms of slide rule. The rule comprises a rectangularly shaped body 10, having a groove 11 extending longitudinally throughout its upper face; a slide 12, arranged to slide in the groove; and a runner 13, slidable upon the body 10. The body 10 constitutes a holder for the slide 12 and the two parts are relatively movable with respect to each other.

The runner carries the usual hair line 14 for locating the relatively movable scales in accurate cooperative position. The runner is movably secured upon the relatively fixed body of the rule in any appropriate manner. In the construction illustrated the runner 13 has flanged members 15 and 16 which slide in grooves 17 and 18 in the side walls 19 and 20 of the body of the rule.

The slide 12 is provided with the usual tongues 21 and 22 which ride in the grooves 23 and 24 of the main body.

The slide 12 has its outer or upper face 25, divided into upper and lower portions 26 and 27 respectively, by the heavy line 28 which may be called a gauge line. This gauge line is provided with three gauge marks: LI, I, and RI (31, 32 and 33 respectively). The I standing for index and the L and R merely indicating the left and right indexes. These index gauge marks do not necessarily correspond to any of the scale marks but may as a result of chance happen to correspond to one or more of the scale divisions. The gauge line and gauge marks are preferably of the same color so as to be easily distinguishable on the face of the rule. These gauge marks will be hereinafter more fully explained, and their color will preferably be one that readily contrasts with the color of the face of the rule. These gauge marks however are so arranged with respect to the position of each of the scales that direct reading of the factors can always be obtained. This avoids the necessarily relatively complicated calculations necessary in ordinary slide rules or even in log rules to obtain the results here contemplated.

The lower half 27 of the upper face 25 of the slide 12 and the lower portion 30 of the body of the rule are provided with the well known standard C and D logarithmic slide rule scales. The scale C—C runs from left to right, divided into decimal fractional parts from 1 to 10 with the scale divisions measured a distance from the left corresponding to the logarithm of the numeral multiplied by the logarithm unit distance being used. This logarithm unit distance is more or less standardized at 10, 12.5 and 25 centimeters for the commonly known 8-inch, 10-inch and 20-inch slide rules. In the drawing only the major divisions have been indicated but it will be readily appreciated that the degree to which the divisions are subdivided is purely a mechanical limitation in manufacture in view of the distance available for the scale. The scale D—D is similarly constructed but is on the relatively fixed part of the rule whereas the scale C—C is on the relatively movable slide. The back of the slide as well as the rule body, where the features of the invention are applied to the duplex type of rule, may be marked with any other scale or scales which may be desirable and useful.

The upper portion 26 of the outer face 25 of the slide 12 has a scale extending along the length thereof with its ends marked M and Y. This scale M—Y, is divided into periods of time more particularly months and years. It is of the logarithmic type. The left hand portion of the scale, extending between the left end at M and the 1 year mark at 32, is divided into consecutively designated monthly periods numbered from 1 to 11. The twelfth month period corresponds to the mark for 1 year. The central portion of the scale is divided into consecutively designated yearly periods from 1 to 10 years. This portion of the scale extends from the one year mark at 32 to the 10 year mark at 33. The extreme right hand portion of the scale between the 10 year mark 33 and the end Y is divided consecutively into 5 year periods for the range from 10 to 20 years. The total length of this scale is the simple length of 12.5 centimeters for each logarithmic unit. The months portion of the scale is measured by spaces corresponding to the fractional part of a year. One month would be one twelfth of a year or 0.8333. The logarithm of this times the length of 12.5 centimeters gives the location of the particular point. The portion of the scale between 1 month and 5 months is divided into 3 major divisions for periods of 10 days, 20 days and 30 days, and into minor divisions of 5 day periods. From the 4 year mark to the 10 year mark the divisions are for 2 months periods, i. e., six divisions. From the 10 year mark to the 20 year mark the sub-divisions are for periods of years and half-years.

The indicator LI at 31 does not necessarily correspond to any major division of scale M—Y. It is marked at one tenth (0.1) year corresponding to a period of one month and six and one half days. The indicator I for convenience corresponds to the one year mark at 32. The indicator RI coincides with the 10 year mark at 33. This relation is determined as a result of practical experience in the evaluation of the most used portions of the scales. These marks coordinate the use of scales Q, R and M—Y, the scale Q of course including scale $Q^1$ and $Q^2$. These scales are hereinafter more fully described. The indicators LI and I mark the beginning and ending of a logarithm division of the scale M—Y. The indicators I and RI designate the beginning and ending of a second logarithm division of scale M—Y. The indicator RI at 33 marks the beginning of a logarithm unit extending to the right therefrom.

The upper portion 29 of the face of the body 10 is provided with two scales; a rate of compound interest scale R and a compound interest factor scale Q which latter has three parts. The scale Q includes: part $Q^1$ from points 34 to 35; a central part from points 36 to 37; and part $Q^2$ from points 38 to 39. The portions $Q^1$ and $Q^2$ of scale Q are parallel to the latter on the face of the rule. Scale R extends from points 36 to 40.

A commonly accepted formula for determining compound interest is $$A = P\left[1 + \left(\frac{r}{100_q}\right)\right]^{nq} \quad (1)$$

where A is the amount; P is the principal placed at compound interest; r is the rate of interest; n is the number of years; and q the number of times each year the interest is compounded.

Where the interest is compounded annually then the formula becomes:

$$A = P\left[1 + \left(\frac{r}{100}\right)\right]^n \quad (2)$$

or $$A = Px \quad (3)$$

$x$ being the value of the compound interest factor on the right.

Where the interest is compounded semi-annually then the formula becomes:

$$A = P\left[1 + \left(\frac{r}{200}\right)\right]^{2n} \quad (4)$$

or $$A = Py \quad (5)$$

where $y$ is the compound interest factor on the right.

Where the interest is compounded quarterly the formula becomes:

$$A = P\left[1 + \left(\frac{r}{400}\right)\right]^{4n} \quad (6)$$

or $$A = Pz \quad (7)$$

where $z$ is the factor on the right which is the compound interest factor.

Each compound interest factor is therefore a factor by which the principal may be directly multiplied to obtain the amount of principal plus interest. Each of the compound interest factors: $x$, $y$ or $z$ can be read directly upon the scale Q of this slide rule.

The compound interest factor scale Q begins with the first part marked $Q^1$ which is designated by the major divisions corresponding consecutively to factors: 1.001 at the left end 34 of scale portion $Q^1$ and running to 1.01 at the right end 35 of scale portion $Q^1$, the central portion of scale Q beginning on the left at 36 with factor 1.01 and running to the right with factor 4.0 at 37. This portion extends across the entire longitudinal extent of the rule. The remaining part of this scale Q is marked $Q^2$ and is at the right above the major portion of scale Q. This portion begins on the left with factor 4.0 at 38 and extends to the right ending with factor 100 at point 39. The total length of the compound interest factor scale Q, which includes $Q^1$ and $Q^2$ is much greater than the length of the rule. The portion giving the factors 1.01 to 4.0 corresponds to those factors having most common use as determined by practical experience so this portion of the scale is arranged to extend the length of the rule. This is the compound interest factor finder scale and is measured in accordance with the logarithms of the logarithms of the factors. The scale contains factors from 1.001 to 100.000 with the parts $Q^1$ and $Q^2$ extending a shorter distance than does the center part Q.

The beginning of the compound interest scale at 34, (division 1.001) and the beginning of the most used portion of the scale at 36, (division 1.01) is arranged so that logarithms of the logarithms of the number corresponding to these divisions have the same mantissa and only differ by unity in their characteristics. In this manner the log log of 1.001 and the log log of 1.01 practically satisfy this requirement. Thus the portions $Q^1$ and Q begin with these division numerals. The same requirement must be satisfied as to portion $Q^2$ and a corresponding division on Q. This is practically true of the log log of 4 and the log log of 1.15.

The logarithmic unit of the scales is a distance of 12.5 centimeters of actual length. This is used for numbers from: 1 to 10; 100 to 1000; 0.01 to 0.10; etc. Of course this unit length can vary as in standard rules.

The scale R is a compound interest rate scale and extends along the upper face 29 of the relatively fixed part of the rule and is divided consecutively from left to right into divisions corresponding to rates of interest from 1% to 25%. It is a log log scale and extends parallel to a portion of the most used part of scale Q. The scale R is indexed with its 1% compound interest aligned with the compound interest factor 1.01 of scale Q and the consecutive divisions to the right being marked up to 25%. It is significant that these divisions are for compound interest for a unit period and a unit principal. Although these divisions are in terms of the rate per cent the division uses the principal plus the rate or 1.10 as the value for locating the division for 10%.

The period is the unit of time in which the principal is capitalized. It may be a week, a month, a year or several years. This is a well known "term" in accounting and business practice.

At the right hand side of the face 29 of the relatively fixed body 10 is a formula for compound interest:

$$Q=R^t \qquad (8)$$

At the lower left portion of slide 12 is placed the formula for discount:

$$d=\left(1-\frac{1}{Q}\right) \qquad (9)$$

At the lower right of the slide 12 is placed the formula for annuities:

$$R=\frac{Q(R-1)}{Q-1} \qquad (10)$$

The Formula (8) is obtained by substituting in Formula (1) values which may be directly determinable on the rule. For the amount A we substitute Q. For the principal P a unit principal 1 is used. The number of times $nq$ that the period is considered or the compound interest calculated is called $t$. The rate used is considered for a period instead of for a year. The part in the bracket $$\left[1+\left(\frac{r}{100}\right)\right] \qquad (11)$$

may then be represented by the period rate R. After making all of the foregoing substitutions in Equation (1) we obtain Equation (8) or $$Q=R^t \qquad (8)$$

Having obtained the proper value of Q as previously described one may solve the particular problem presented by the use of the following equations wherein the amount, principal or value forming the basis of the computation must be multiplied by the factor resulting from the equations.

By using the same substituted values any of the well-known equations used by accountants for making various commercial computations are very simple and can be directly performed. A number of those equations after substitution take the following form:

| | | | |
|---|---|---|---|
| Compound discount | $\left(1-\frac{1}{Q}\right)$ | | (12) |
| Present worth at compound discount | $\left(\frac{1}{Q}\right)$ | | (13) |
| Amount of annuity at end of each compounding period | $\left(\frac{Q-1}{r}\right)$ | or $\left(\frac{Q-1}{R-1}\right)$ | (14) |
| Amount of annuity at beginning of each compounding period | $\left[\left(\frac{Q-1}{r}\right)(1+r)\right]$ | or $\left[\left(\frac{Q-1}{R-1}\right)R\right]$ | (15) |
| Present worth of annuity at end of each compounding period | $\left(\frac{Q-1}{Q' R}\right)$ | or $\left[\frac{Q-1}{Q'(R-1)}\right]$ | (16) |
| Present worth of annuity at beginning of each compounding period | $\left[\left(\frac{Q-1}{Q' r}\right)(1-r)\right]$ | or $\left[\left(\frac{Q-1}{Q'(R-1)}\right)R\right]$ | (17) |
| Sinking fund with payments at end of each compounding period | $\left(\frac{r}{Q-1}\right)$ | or $\left(\frac{R-1}{Q-1}\right)$ | (18) |
| Sinking fund with payments at beginning of each compounding period | $\left[\frac{r}{(Q-1)(1+r)}\right]$ | or $\left[\frac{R-1}{(Q-1)R}\right]$ | (19) |
| Periodic payment at end of each compounding period | $\left(\frac{rQ'}{Q-1}\right)$ | or $\left[\frac{(R-1)Q'}{(Q-1)}\right]$ | (20) |
| Periodic payment at beginning of each compounding period | $\left[\frac{(rQ')}{(Q-1)(1+r)}\right]$ | or $\left[\frac{(R-1)(Q')}{(Q-1)R}\right]$ | (21) |

The Formulas (13) and (20) are shown on the slide, the formulas being shown as $$d=1-\frac{1}{Q}$$

and $$R=\left[\frac{Q(R-1)}{(Q-1)}\right]$$

wherein $d$ is the factor for obtaining the compound discount of one monetary unit when the compound discount factor is Q and wherein R is the payment to be made at the end of any discount period for each monetary unit when the compound interest factor is Q and the amount is a unit principal at an actual interest rate R. Obviously both $d$ and R are to be multiplied by the number of monetary units involved. That is, if an amount is to be loaned with the compound interest deducted in advance, the quantity $d$ will be multiplied by the amount and if an amount is to be amortized by periodic payments at the end of each compounding period, the quantity R will be multiplied by the amount.

The scales of the slide rule of this invention are used in the following manner to obtain factors for operations relative to compound interest or related calculations. To obtain a compound interest factor the index I on the slide of the rule is positioned below the division corresponding to the rate of compound interest in the problem to be solved, which is located on scale R. The runner 13 is then moved along the rule so that its hair line 14 coincides with the division on the scale M—Y to the number of years or months being the period for which the interest factor must be computed, then by reading under the hair line on the scale Q the compound interest factor is directly obtained. This factor corresponds to a unit principal, therefore, to obtain the correct value of the principal plus interest which is required at the end of the period and at the rate of interest used, it is merely necessary to multiply the actual principal by this factor and the result is directly obtained. This simple multiplication can be obtained on the C and D scales of the rule in the usual manner. Of course if a greater degree of accuracy is required this multiplication may be accomplished on a computing machine.

If the rate of interest or the period of time is so great that the resulting compound interest factor is greater than 4 thereby falling outside of the range of the lower or most used portion of scale Q it then becomes necessary to use the index mark RI instead of the index mark I, and to determine the compound interest factor from the portion of the scale Q designated $Q^2$. When these conditions exist the index RI is positioned below the division mark corresponding to the rate of interest and the runner 13 is moved along the slide until the hair line 14 corresponds to the period being considered then by reading along the hair line 14 on the portion $Q^2$ of the scale Q the compound interest factor may be directly obtained. The use of the factor will be the same as before. If the rate of interest or the period of time is very small the compound interest factor will fall to the left of the portion of the scale Q which is most commonly used and in this instance it will be necessary to obtain the value of the compound interest factor from a reading on the portion $Q^1$ of the scale Q. To obtain this reading the index mark LI will be positioned below the rate of interest and the runner 13 used in the same manner as heretofore described, the result being obtained by reading the division of the scale $Q^1$ which falls under the hair line 14.

In order to understand the slide rule and other operations, after the factor Q has been determined from the manipulation of the rule in connection with known data such as the rate of interest, the number of periods per year at which the interest is to be computed, and the number of years in which this number of periods will be applied, examples such as those involving Formulas (12) and (20) may be considered. Regarding Formula (12), the value of one divided by Q is obtained in the usual manner by slide rule scales of the ordinary logarithmic type C and D. This value is then subtracted from unity and the resulting value is then multipled by the amount in question. It will be readily understood that the computations on the rule in so far as the compound interest factors are concerned will always be determined in terms of unit principal or unit amount so that the actual principal or amount must always be multiplied by the resulting factor. This resultant determination will then be the amount which is to be deducted arithmetically from the amount of the loan.

Now suppose it is desired to amortize a known amount bearing interest at a definite rate in a period of years with a definite number of payments being made each year. The value of Q is found from these factors on the direct reading of the scale Q (including portions $Q^1$ or $Q^2$). If we now substitute the values in the formula found on the lower right hand corner of the slide of the rule we obtain the Formula (20) as a function of $r$ or the actual interest rate, that is, the left hand equation. The equation on the right is in terms of the resulting interest rate which is the actual interest rate plus one. After substituting the values in the formula the resulting computations shall be multiplied arithmetically by the amount to obtain the actual value of the periodic payment. The computations to be made by the other formula will be similarly made.

On these formulas, Q is the compound interest factor, R is the rate, and Q' is, on the present worth of annuity, the compound interest factor at the rate of the present worth, and on the periodic payment the compound interest factor at the rate of the principal Q' is determined on the scales the same as Q. Of course, in most common cases the two rates are equal, $Q=Q'$. In all cases the factor obtained must be multiplied by the principal in order to determine the whole result.

*Examples*

1. Find the compound interest factor for 15 years at 5% per year. Set the index I of the slide that is at the central part of the scale M—Y below the division marked 5 on the scale R, then with the hair line 14 of the runner 13 read above the division 15 of the scale M—Y on the factor scale Q the value 2.078.

2. Find the compound interest factor for 14 months at 1.5% per month. Set the division marked one month of the scale M—Y under the division marked 1.5 of the scale R, then over the division marked 1 year 2 months of the scale M—Y read on scale Q the factor 1.232.

3. Find the factor for the periodic payment at end of each period, to amortize $1.00 and its interest, in 20 years at the annual rate of 5%, being equal to the rates of the principal and the periodic payments. Determine factor Q by the slide rule using the interest rate, periods per year, number of years and the value of $Q=2.65$. In a computation of this type the values of Q and Q' are equal.

Then solve the appropriate Formula (20) with the aid of the scales C and D of the common slide rule:

$$\text{Periodic payment} = \frac{RQ'}{Q-1} \quad (20)$$

$$\text{Periodic payment} = \left[\frac{.05 \times 2.65}{(2.65-1)}\right] = 0.08025$$

5. Find the factor for the periodic payment with its interest at 5% per period, in 5 periods, to amortize $1.00 and its interest at 4% per period. First it is necessary to obtain with the scales Q, R and M—Y the values of Q' and Q. Using the rate of 4% we determine the compound interest factor which in this case is $Q'=1.217$. Using the rate of 5% we determine the factor Q which is 1.276. In this problem Q and Q' of the formula are not the same. Now substituting in Equation (20) we obtain:

$$\text{Payment} = \frac{RQ'}{Q-1}$$
$$= \left[\frac{0.05 \times 1.217}{(1.276-1)}\right]$$
$$= 0.2202$$

It will be understood that variations within the true spirit and scope of the invention are to be determined by the appended claims.

What I claim is:

1. In combination a slide rule comprising relatively movable parts; a log scale carried by the relatively movable member and extending from left to right thereon and having its divisions marked in terms of periods of time beginning with 1 month at the left and extending consecutively to 20 years at the right and with the 0.1 year and 1 year divisions marking the beginning and ending of a logarithmic unit; and a log log scale of compound interest factors extending on the relatively fixed member from the left hand edge thereof toward the center thereof with its divisions marked from 1.001 to 1.01, and then continuing from the extreme left to the extreme right of the relatively fixed member with its divisions marked consecutively from 1.01 to 4.0, and then continuing from a substantially central portion of the relatively fixed member to the right with its divisions marked consecutively from 4.0 to 100; a log log scale carried by the relatively fixed member and extending from the left toward the right thereof and having its major divisions marked in terms of compound interest rates from 1 to 25 with the 1% and 25% divisions of this scale aligned with the 1.01 and 1.25 divisions of the other log log scale; each of said scales being positioned with respect to the others to provide cooperative action whereby to directly mechanically determine factors of compound interest or the like.

2. In combination a slide rule comprising relatively movable parts; a log scale carried by the relatively movable member and extending from left to right thereon and having its divisions marked in terms of periods of time beginning with 1 month at the left and extending consecutively to 20 years at the right and with the 0.1 year and 1 year divisions marking the beginning and ending of a logarithmic unit; and a log log scale of compound interest factors extending on the relatively fixed member from the left hand edge thereof toward the center thereof with its divisions marked from 1.001 to 1.01 and with the factors 1.001 to 1.01 corresponding to a logarithmic unit of the scale, and then continuing from the extreme left to the extreme right of the relatively fixed member with its divisions marked consecutively from 1.01 to 4.0, and then continuing from a substantially central portion of the relatively fixed member to the right with its divisions marked consecutively from 4.0 to 100; a log log scale carried by the relatively fixed member and extending from the left toward the right thereof and having its major divisions marked in terms of compound interest rates from 1 to 25 with the 1% and 25% divisions of this scale aligned with the 1.01 and 1.25 divisions of the other log log scale; each of said scales being positioned with respect to the others to provide cooperative action whereby to directly mechanically determine factors of compound interest or the like.

J. G. VALENZUELA.